United States Patent [19]

Meunier et al.

[11] Patent Number: 5,123,156
[45] Date of Patent: Jun. 23, 1992

[54] METHOD FOR THE PRODUCTION OF A READ-WRITE MAGNETIC HEAD

[75] Inventors: Paul-Louis Meunier, Paris; Jean-Marc Coutellier, Maurepas, both of France

[73] Assignee: Thomson-CSF, Puteaux, France

[21] Appl. No.: 566,345

[22] PCT Filed: Dec. 15, 1989

[86] PCT No.: FR89/00657
§ 371 Date: Aug. 22, 1990
§ 102(e) Date: Aug. 22, 1990

[87] PCT Pub. No.: WO90/07772
PCT Pub. Date: Jul. 12, 1990

[30] Foreign Application Priority Data

Dec. 23, 1988 [FR] France .................. 88 17083

[51] Int. Cl.⁵ .............................................. G11B 5/42
[52] U.S. Cl. .................................... 29/603; 360/121; 360/125
[58] Field of Search ............... 29/603; 360/119–121, 360/125–127

[56] References Cited

U.S. PATENT DOCUMENTS 2,647,031 4/1954 Buhrendorf .
3,000,078 9/1961 Emenaker et al. .................... 29/603
3,613,228 10/1971 Cook .
4,412,379 11/1983 Lemke et al. ......................... 29/603
5,016,342 5/1991 Pishavoda et al. .................. 29/603

FOREIGN PATENT DOCUMENTS 032230 7/1981 European Pat. Off. .
1948215 4/1970 Fed. Rep. of Germany .
1293374 12/1962 France .
727234 3/1955 United Kingdom .

OTHER PUBLICATIONS

IBM Technical Disclosure Bulletin, vol. 11, No. 11, Apr. 1969, Armonk, N.Y., US, p. 1595 J. M. Brownlow et al.: "Batch-Fabricated Magnetic Head".

Primary Examiner—Carl E. Hall
Attorney, Agent, or Firm—Oblon, Spivak, McClelland, Maier & Neustadt

[57] ABSTRACT

A magnetic head and a method for producing the magnetic head comprising the steps of:
producing a groove in a first face of a substrate;
depositing a material having good magnetic characteristics on the walls of the groove;
depositing a non-magnetic material in the groove over the material having good magnetic characteristics;
machining a second face of the substrate until the non-magnetic material is reached, so as to create a magnetic gap; and
bonding a part carrying a magnetic layer onto the first face of the substrate so as to form a magnetic circuit.

7 Claims, 4 Drawing Sheets

METHOD FOR THE PRODUCTION OF A READ-WRITE MAGNETIC HEAD

BACKGROUND OF THE INVENTION

The invention relates to a method for the production of a read-write magnetic head and particularly to a magnetic head produced by a thin-film technique or, more precisely, thin-film planar heads.

DISCUSSION OF BACKGROUND

A planar type magnetic head possessing magnetic poles produced by a thin-film technique comprises, as is represented in FIG. 1, a magnetic circuit T1 in ferrite, for example, possessing a face T2 carrying two thin-film magnetic poles T3 and T4, separated by an air gap T5. Coils T6 and T7 are wound around the magnetic circuit T1, enabling a magnetic flux to be induced. However, such a magnetic head shows large magnetic losses which reduce the efficiency of the magnetic head. By way of example, the leakages of magnetic field lines have been drawn in FIG. 1. These large leakages produce as a consequence a loss of signal. The invention brings a solution to this problem and thus enables the magnetic losses to be reduced.

SUMMARY OF THE INVENTION

The invention relates to a method for the production of a read-write magnetic head, characterized in that it comprises the following steps:

(a) the production in a substrate made of non-magnetic material, from a first face of the substrate, of a groove possessing two side walls and a bottom;

(b) the production in the groove of a layer of a material with good magnetic permeability covering the two side walls and the bottom of the groove;

(c) the deposition of a non-magnetic material in the groove;

(d) the machining of a second face of the substrate opposite to the first face so as to reach the non-magnetic material located in the groove and to create an air gap between the magnetic materials located on the two side walls;

(e) the bonding of a part carrying a layer of a magnetic material onto the first face of the substrate in such a way that this layer of magnetic material magnetically couples the layers of magnetic material located on the two side walls of the groove.

The invention also relates to a magnetic head produced by the preceding method, characterized in that it comprises:

a substrate of non-magnetic material possessing a slit which opens towards an upper face of this part, this slit being bounded by two side walls and a bottom;

a layer of a material with high magnetic permeability covering the two side walls and the bottom and flush with the upper face of the substrate;

a non-magnetic material situated between the layers of the high magnetic permeability material covering the sides, this non-magnetic material being flush with the upper face of the substrate;

at least one coil passing through the slit 11 of the substrate.

BRIEF DESCRIPTION OF THE DRAWINGS

The different objects and characteristics of the invention will appear more clearly in the description which will follow, given by way of example by referring to the appended figures which represents.

DESCRIPTION OF THE PREFERRED EMBODIMENTS

By making reference to FIGS. 2 to 11, an example of the embodiment of a method of production according to the invention will first be described.

Figure 1:
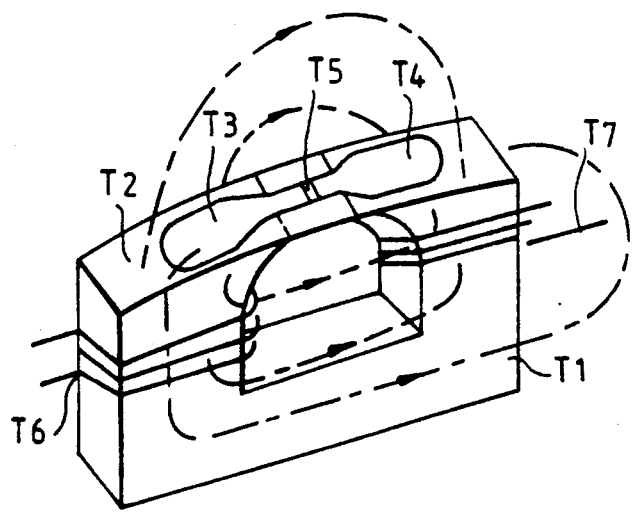
FIG. 1, a magnetic head known in the technique and already described previously.
Figure 2:
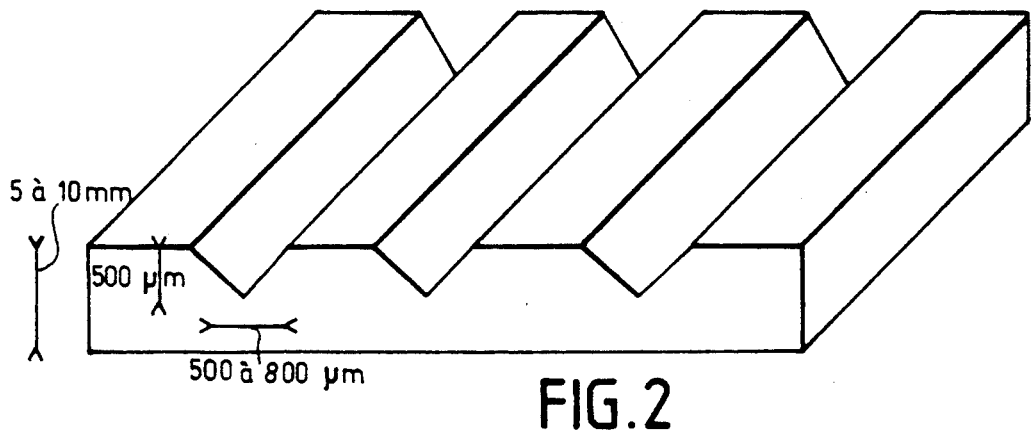
FIGS. 2 to 11, different steps in the method of producing a magnetic head in accordance with the invention.
Figure 3:
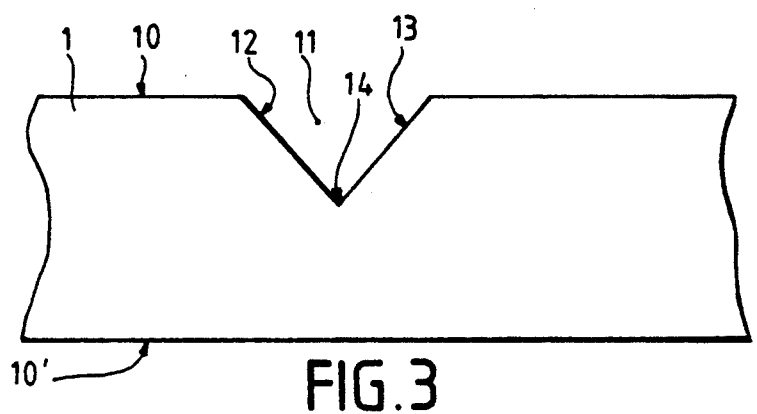

In the course of a first step, represented in FIGS. 2 and 3, grooves such as 11 are cut into a substrate of non-magnetic material This groove has, for example, a triangular shape bounded, from the surface 10 of the substrate, by two side walls 12 and 13 and possesses a bottom 14.

By ay of example, provision will, be made for grooves with a depth of about 500 micrometers and a width from 500 to 800 micrometers in a thickness of substrate from 5 to 10 mm.

Figure 4:
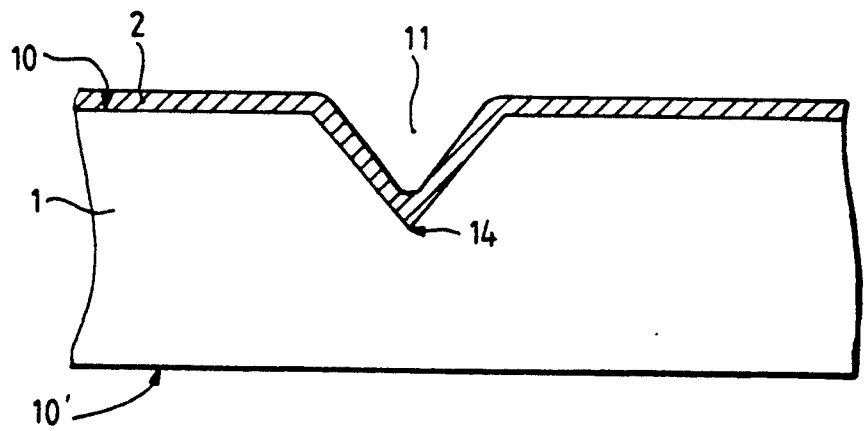

In the course of a second step represented in FIG. 4, the face 10 and the sides 12 and 13 of the groove 11 are coated with a layer 2 of a material having good magnetic characteristics (high magnetic permeability, low coefficient of coercivity, high coefficient of saturation). This layer 2 will be, for example, 10 to 50 micrometers thick. The material used may be a material such as an iron-based aluminum-silicon alloy referred to under the name Sendust. Its preferred mode of deposition is cathode sputtering.

The layer 2 may also be produced in a laminated form, i.e. in the form of an alternation of layers of a magnetic material having a given crystal structure, termed columnar (the molecules being arranged in columns), and layers of a material of different crystallographic structure which may or may not be magnetic.

In the course of a third step, non-magnetic material 3 is deposited in each groove 11. This material may be of glass, whose melting point is situated towards 500° to 600° C.

Figure 5:
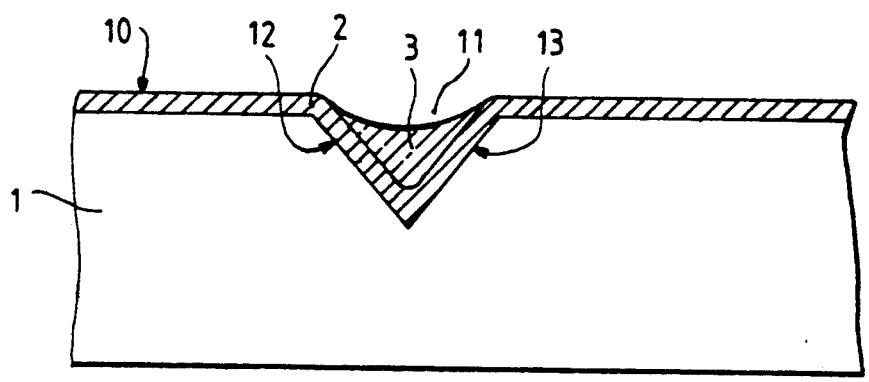
Figure 6:
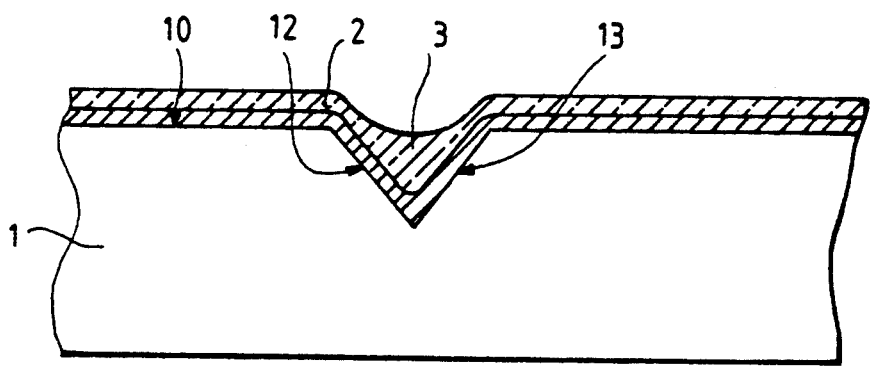

The structure obtained may have the configuration represented in FIG. 5 if the glass was deposited only in each of the grooves. It may also have the configuration represented in FIG. 6 if the whole system was given a deposit of glass.

Figure 7:
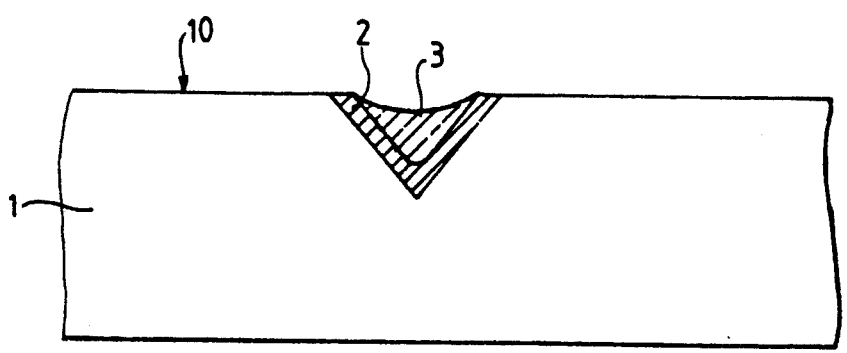

In the course of a fourth step, machining followed by polishing is carried out on the face 10 so as to remove the material of the layer 2 (Sendust) and the glass material (3) situated on the face 10 and not lying in the groove 11. In this way, the structure represented in FIG. 7 is obtained.

Figure 8:
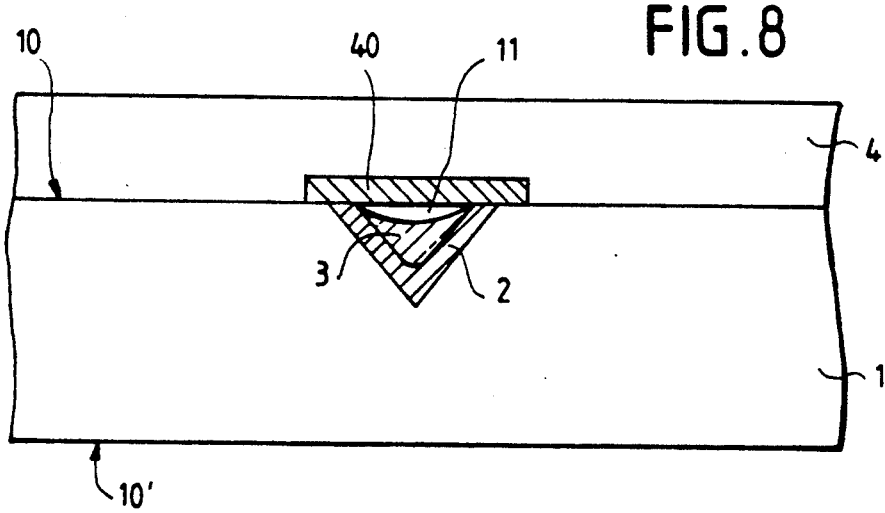

In the course of a fifth step represented in FIG. 8, a part 4 carrying a layer 40 of a magnetic material is bonded on to the face 10 of the substrate. The bonding may be made with the help of bonding points 41, 42 in melted glass, for example. If the layer 40 does not cover all the surface of the part 4, which is the case in FIG. 8, it is necessary at least that to each groove 11 subjected to the above treatment there corresponds one layer of magnetic material 40. According to a preferred example of an embodiment of the invention, the layer, 40 is of Sendust and is about 10 to 50 micrometers thick, but according to a variant of the embodiment, the part 4 may itself be made of a magnetic material (ferrite) and then does not incorporate the layer 40.

Figure 9:
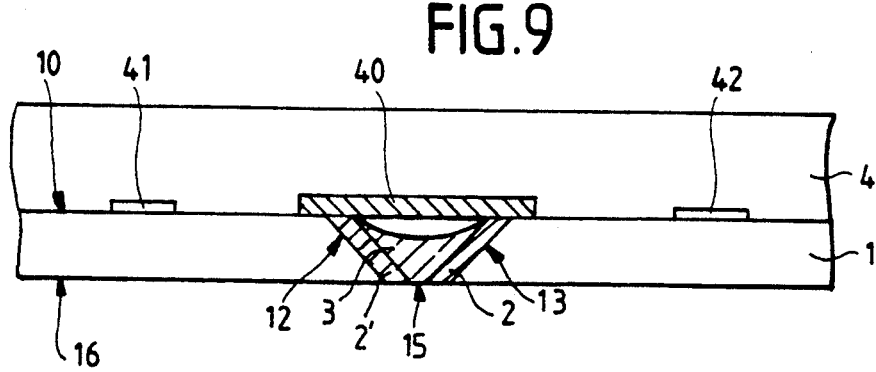

In the course of a sixth step represented in FIG. 9, the face 10' of the substrate 1 opposite to the face 10 is machined and polished until the non-magnetic material 3 is reached. The material 2, situated on the side walls 12 and 13 of the groove, is separated into two parts 2, 2' by an air gap 15. By way of example, the width of, the air gap 15 has a width of about a few micrometers. The magnetic circuit of the magnetic head has thus been produced, the face 16 comprising two magnetic poles separated by a gap 15. To complete the magnetic head, coil conductors 6 and 7 are inserted between the material 3 and the part 4.

Figure 10:
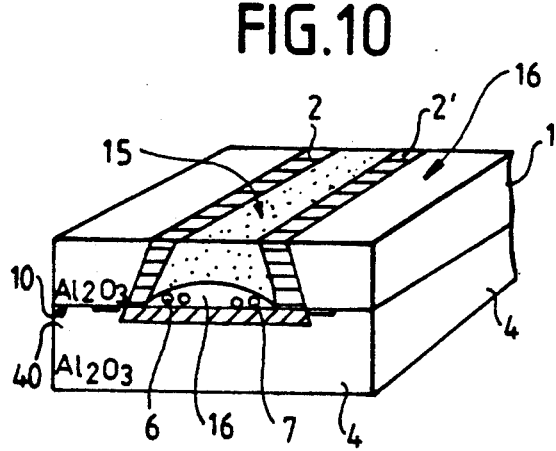
Figure 11:
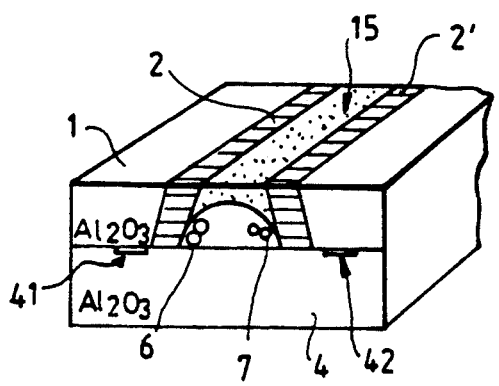

The structure represented in FIG. 11 is a variant on that of FIG. 10 according to which the part 4 is made of magnetic material and does not then incorporate the layer of magnetic material 40.

Figure 12:
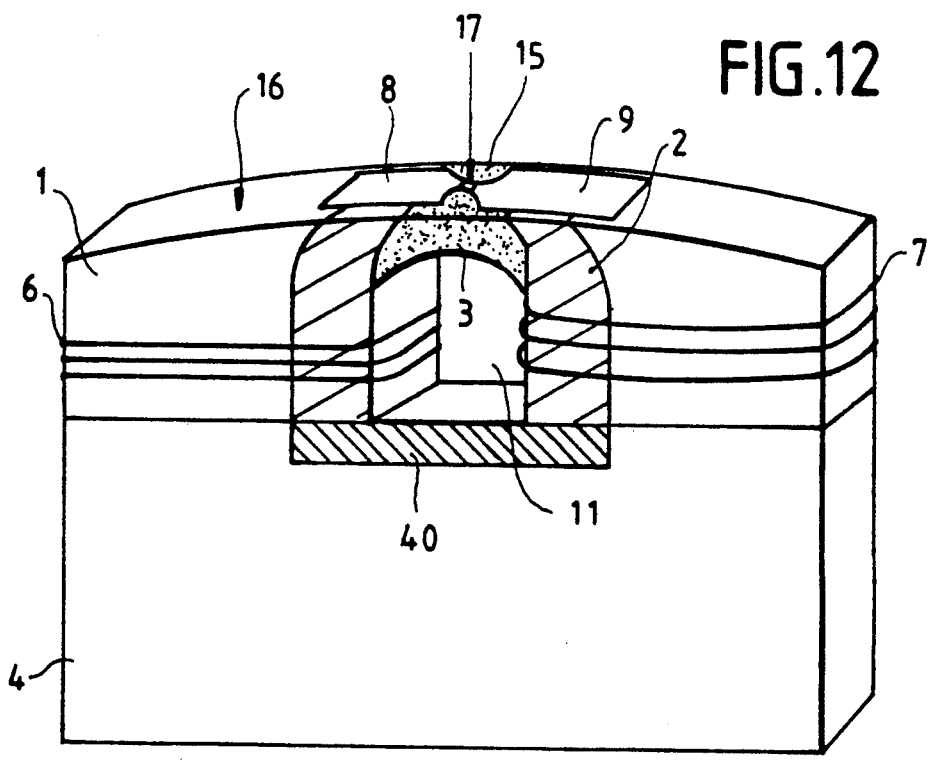
FIG. 12, an example of the embodiment of a thin-film magnetic head according to the invention.

FIG. 12 represents a magnetic head produced in accordance with the invention. This figure shows once again the substrate 1, in which a groove 11 has been produced, covered on the inside with a layer 2 of magnetic material. This groove is partly filled with a non-magnetic material 3, for example glass, which is flush with the face 16 of the magnetic head. The magnetic circuit is completed by a part 4 carrying a layer 40 of a magnetic material. Coils 6 and 7 have been wound around the layers 2 and 2' by passing through the groove 11.

The air gap 15 produced by the material 3 has a width of several micrometers, even of several tens of micrometers.

Two thin-film magnetic poles 8 and 9 are produced on the face 16, each situated above the material 2, 2' of one wall of the groove 11. The two poles 8 and 9 are separated by an air gap 17.

This air gap 17, produced between the two thin-film poles 8 and 9, may have a width calibrated by known procedural techniques, such as those described in the French patent application No. 86 14974.

Figure 13:
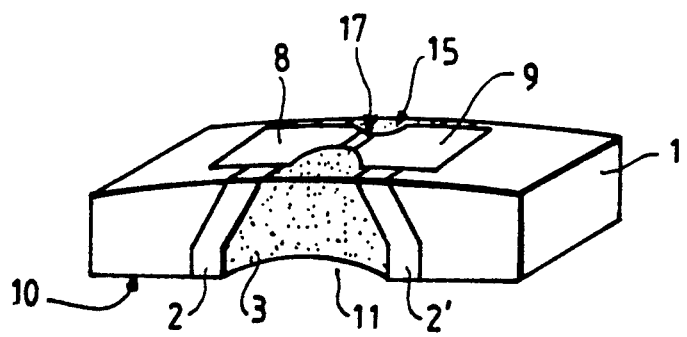
FIG. 13, a variant of the embodiment of a thin-film magnetic head according to the invention.
Figure 13:
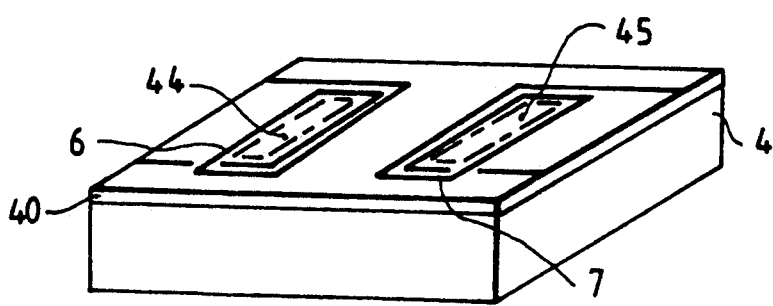

FIG. 13 represents, in an exploded view, a variant of the embodiment of the magnetic head according to the invention.

According to this variant, the coils 6 and 7 are produced, for example by microlithography, on the face of the part 4 which has to be bonded to the face 10 of the substrate 1. On this part 4, the zones 44 and 45 drawn with broken lines represent the zones where the layers 2 and 2' of the side walls of the groove 11 must be applied. The circuits of the coils 6 and 7 are produced in planar form around the zones 44 and 45 and have connections enabling them to be connected by means, not represented, to external circuits. These coils 6 and 7 may be insulated by an insulating layer from the layer 40 of magnetic material.

The invention thus makes it possible to produce a magnetic head in which the length of the magnetic circuit may be reduced, which decreases the leakages.

The material of the magnetic circuit (layer 2 and layer 40) has permeability and coercive field characteristics which may be considerably better at high frequency than those with a ferrite material. This is the way in which, with Sendust, it is possible to obtain magnetic permeabilities of 1000 at 20 MHz, 800 at 50 MHz and 500 at 100 MHz, and even better magnetic characteristics by providing for a magnetic circuit made of laminated Sendust, whereas with a ferrite material, permeability characteristics are obtained beyond 50 MHz which are difficult to exploit.

Moreover, the substrate 1 may be made from a hard material which, forming the body of the head, provides better resistance to abrasion from a tape than a ferrite body.

The surface 16 of the head may be covered with a priming coat (TiC) and by an anti-chafing material such as a carbon-based material.

Finally, the magnetic material comprising the closing circuit for the field lines may be annealed at a temperature compatible with the substrate but completely unconnected with contingencies due to the glass or the coil. For example, the substrate 1 may be made of $Al_2O_3$ and the magnetic material of Sendust annealed at 650° or 700° C.

The magnetic head of the invention lends itself to batch production. In fact, several magnetic heads may be produced on the same groove 11 and the heads are then cut perpendicular to the groove. In addition, several grooves may be made in the same substrate 1. In this case, after the procedure described above, the substrate is cut between the grooves, parallel to them. It is thus also possible to produce a surface of magnetic heads and subsequently to perform the two types of cut.

It is very clear that the above description has only been given as a non-restrictive example and that other variants may be envisaged without going outside the scope of the invention. The numerical examples and the nature of the materials indicated have been provided only to illustrate the description.

We claim:

1. A method for the production of a read-write magnetic head, comprising the steps of:
   (a) forming a groove in a first face of a substrate made of non-magnetic material, the groove having two side walls and a bottom;
   (b) forming a layer of a material with good magnetic permeability covering the two side walls and the bottom of the groove, and completely covering the first face of the substrate;
   (c) depositing a non-magnetic material in the groove on top of the layer of material with good magnetic permeability;
   (d) machining away the non-magnetic material and the layer of material with good magnetic permeability from the first face of the substrate to expose all portions of the first face of the substrate located outside the groove;
   (e) machining a second face of the substrate opposite to the first face so as to reach the non-magnetic material located in the groove and to thereby create a gap between the magnetic materials located on the two side walls;
   (f) bonding a part carrying a layer of a magnetic material onto the first face of the substrate in such a way that the layer of magnetic material magnetically couples the layers of magnetic material located on the two side walls of the groove.

2. A method according to claim 1, comprising an additional step, after machining of the second face of the substrate, of:
   providing two poles made of thin-film magnetic material separated by an air gap situated above the gap separating the magnetic materials situated on the two side walls.

3. A method according to claim 1, wherein, during the step of depositing the non-magnetic material, the non-magnetic material does not fill the whole groove such that a space is left free between said layer of magnetic material and said non-magnetic material and wherein, after bonding of the said part carrying a layer of magnetic material, at least one coil is taken through said space left free between the non-magnetic material and the said part.

4. A method according to claim 1, wherein, before the bonding of the part carrying a layer of a magnetic material, at least one plane coil is produced on this part, insulated from the magnetic material and surrounding a zone of contact of the layers of magnetic material with the said part.

5. A method according to claim 1, wherein the layer of material with good magnetic permeability deposited in the groove is produced in the form of an alternation of layers of a material with columnar growth and layers of a material with a different crystal structure.

6. A method according to claim 1, wherein the step of bonding of a part onto the first face of the substrate is performed before the step of the machining of the second face of the substrate.

7. A method according to claim 1, wherein said groove is one of several grooves produced in the same substrate, and wherein the different steps of the method are applied to each of these different grooves.

* * * * *